(12) United States Patent
Lim et al.

(10) Patent No.: US 10,416,753 B1
(45) Date of Patent: Sep. 17, 2019

(54) DATE-BASED COMPUTING DEVICE CHARGE MANAGEMENT

(71) Applicant: Amazon Technologies, Inc., Reno, NV (US)

(72) Inventors: James Robert Lim, San Jose, CA (US); Stephen Anthony Kitchens, Fremont, CA (US); Vidhyananth Ramasamy Venkatasamy, Sunnyvale, CA (US); Kathryn Chinn Abel, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/964,902

(22) Filed: Dec. 10, 2015

(51) Int. Cl.
*G06F 1/32* (2019.01)
*G06F 1/3296* (2019.01)
*G06F 1/3212* (2019.01)

(52) U.S. Cl.
CPC .......... *G06F 1/3296* (2013.01); *G06F 1/3212* (2013.01)

(58) Field of Classification Search
None
See application file for complete search history.

(56) References Cited

U.S. PATENT DOCUMENTS

| | | | | |
|---|---|---|---|---|
| 4,952,862 A * | 8/1990 | Biagetti | ............... | G01R 31/362 320/132 |
| 5,684,404 A * | 11/1997 | Millar | ............... | G01R 31/3648 324/426 |
| 6,051,957 A * | 4/2000 | Klein | ............... | G01R 31/3686 320/107 |
| 6,271,605 B1 * | 8/2001 | Carkner | ............... | H02J 7/0031 307/125 |
| 8,515,499 B1 * | 8/2013 | Stekkelpak | ....... | H04M 1/72569 455/566 |
| 2003/0025482 A1 * | 2/2003 | Tsukamoto | ............ | A61N 1/378 320/157 |
| 2003/0201755 A1 * | 10/2003 | Briggs | .................. | G06F 1/1626 320/135 |
| 2006/0139003 A1 * | 6/2006 | Fischer | ............. | H01M 10/4257 320/132 |
| 2009/0237388 A1 * | 9/2009 | Seki | ...................... | G06F 1/3228 345/211 |
| 2010/0109931 A1 * | 5/2010 | Esnard | .................... | H01F 38/14 341/176 |
| 2012/0198262 A1 * | 8/2012 | Sauerwein, Jr. | .. | H04W 52/0277 713/340 |

(Continued)

*Primary Examiner* — Danny Chan
(74) *Attorney, Agent, or Firm* — Hogan Lovells US, LLP (57) ABSTRACT

The time remaining until a charge-based event occurs on a computing device can be determined and notification provided to the user in order to prevent a shutdown due to loss of charge, extend the lifetime of the battery, and prevent a device lockout, among other such advantages. The current charge and information about the battery and device can be used to calculate various time periods, such as the time until a 0% state of charge (SOC) whereby a user will be unable to use the device until charging, as well as the time until a 0V lockout, whereby the device will become unusable. The time period and a charge-by date can be displayed on the device at the appropriate time(s), and notifications can be generated when the device is nearing a critical state. Such information also indicates to warehouses when devices become unsellable or at least require charging.

20 Claims, 7 Drawing Sheets

(56) References Cited

U.S. PATENT DOCUMENTS

| | | | | |
|---|---|---|---|---|
| 2013/0271285 A1* | 10/2013 | Sako | .................... | G08B 21/182 340/636.1 |
| 2014/0035514 A1* | 2/2014 | Wang | .................... | H02J 7/0047 320/107 |
| 2014/0191590 A1* | 7/2014 | Yanagidaira | .......... | H02J 7/0063 307/130 |
| 2015/0162768 A1* | 6/2015 | Okuda | ................ | G01R 31/3679 320/134 |
| 2015/0241519 A1* | 8/2015 | Lee | .................... | G01R 31/3606 702/63 |
| 2015/0281625 A1* | 10/2015 | Innes | ................... | H04N 5/4403 348/734 |
| 2015/0318726 A1* | 11/2015 | Luo | ..................... | H01M 10/441 320/134 |
| 2016/0020624 A1* | 1/2016 | Chang | .................. | H02J 7/0029 320/136 |
| 2016/0054392 A1* | 2/2016 | Lee | ....................... | H01M 10/48 702/63 |
| 2016/0077159 A1* | 3/2016 | Petrucelli | ............. | G01R 31/362 324/426 |
| 2016/0187964 A1* | 6/2016 | Zhu | ....................... | G06F 1/3287 713/323 |
| 2016/0236585 A1* | 8/2016 | Miftakhov | .......... | B60L 11/1844 |
| 2016/0344206 A1* | 11/2016 | Ono | ...................... | H02J 7/0031 |

\* cited by examiner

DATE-BASED COMPUTING DEVICE CHARGE MANAGEMENT

BACKGROUND

Users are increasingly using a variety of portable devices to accomplish various tasks. Oftentimes a user will have multiple devices, as well as multiple versions of a certain type of device. While a user might use some devices daily, and thus charge these devices regularly, other devices might be used less frequently. As an example, a user might spend most time using the user's newest tablet computer without frequently utilizing an older tablet computer. If the user does not remember to charge the older device regularly, it is possible that a lockout state might be reached that will prevent the device from being used. A lockout state is generally used to ensure battery safety and reliability. A user may be unaware that a lockout state is approaching until it is too late, at which point the device may no longer be functional.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing charge for a computing device. In particular, various embodiments provide for the automatic calculation of dates by which a device should be charged in order to avoid certain charge- or battery-related events. These can include, for example, a shutdown of the device due to lack of charge or a lockout of the device whereby the device may become inoperable. The date information can be displayed on the device in order to notify a user, and can be monitored by a remote system or service, in some embodiments, that is able to send notifications as needed. Various other dates can be calculated and provided as well, such as dates by which to charge the device to extend the lifetime of the battery or to prevent certain types of damage to the battery, among other such options. The information can also be useful to a warehouse manager or other such entity, as the dates at which devices lose charge or become inoperable can be quickly determined and devices charged or removed from inventory as appropriate.

Various other functions and advantages are described and suggested below as may be provided in accordance with the various embodiments.

Figure 1A:
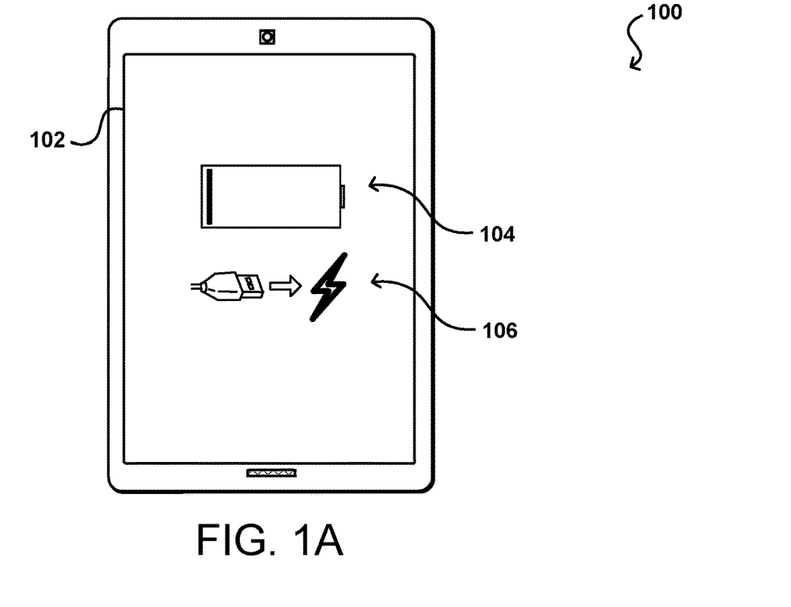
FIGS. 1A and 1B illustrate example displays of content including charging recommendations that can be provided in accordance with various embodiments.

FIG. 1A illustrates an example display of content on a computing device 100 that can be presented in accordance with various embodiments. In this example, the charge on the battery of the device is getting low, such that content is displayed on a display screen 102 of the device to indicate that a user should charge the device and/or battery within the device. Such a "dead battery" icon might be displayed when the battery reaches a certain level of charge, such as a 0% state of charge (SOC). The SOC is defined as the available capacity expressed as a percentage of a reference capacity value, such as the rated capacity or current capacity of the battery. The reference capacity value for devices discussed herein can relate to a determine capacity at which a device can function as intended and without risk of damage, such as around 3.4V for some devices. Although a primary display screen is illustrated, it should be understood that such information can be conveyed in a number of different ways using a number of different components or techniques. Further, although the figure illustrates a portable device with a non-removable battery, it should be understood that other types of devices can utilize approaches discussed and suggested herein.

Battery safety is increasingly becoming a priority with battery technologies pushing to higher and higher energy densities. In many instances a device stored for a period of time might have the charge on the battery drain to a value of less than one volt, although other voltages and charge values can occur for different types of batteries or power storage devices as discussed and suggested herein. Since the charge on the battery can drain or decrease over time, it is possible that a device left uncharged for a period of time will self-discharge to very low charge state. Different types of batteries are known to experience various types of problems with in a low charge state, as may include copper dissolution, cell swelling, and lithium plating upon charging. These problems can put battery and device safety, reliability, and performance at risk.

For at least some conventional types of batteries used in portable computing devices, it can take a year or longer to reach a charge state of less than one volt, from a full or near full charge. However, with smaller batteries (i.e., batteries with less than 400 mAh), a lower voltage threshold of less than one volt could be reached in approximately two years. With this in mind, various protection integrated circuit (IC) vendors are offering a zero volt lockout feature. Zero volt lockout as used herein refers to a state of a battery where the battery cell voltage drops below one volt (or other defined setting by the IC vendor), such that the device is unable to charge. In some embodiments this can be the result of the charge field effect transistor (FET) being permanently open. There are various benefits to a zero volt lockout feature, such as safety benefits resulting from protecting the user from a battery with less than a one volt charge. Further, a monitoring service for the device, or other such system, can determine when the battery is about to be deeply discharged, such as in response to receiving such information from the device, whereby the user can be prompted to charge the device such that battery reliability and performance can be maintained. As a trade-off of such a feature, however, a device stored for a long period of time might be locked out and unable to be charged, such that the device will not be useable. Further, warehouses stocking devices for long periods of time would have to manage the devices in order to prevent unusable devices from being stocked and/or shipped to customers.

Figure 1B:
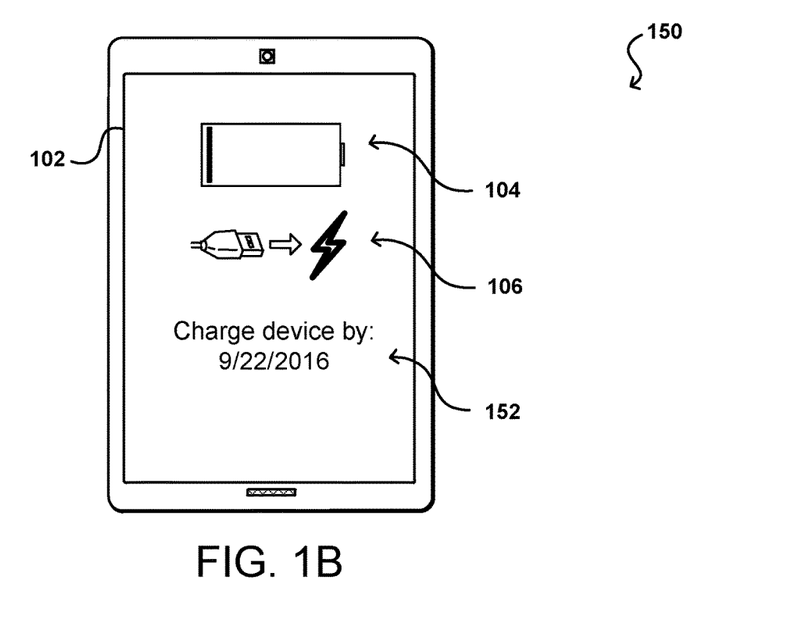

Accordingly, approaches in accordance with various embodiments can provide for the prompting of users of a computing device to charge the device within a determined timeframe. The prompting can be provided using any appropriate mechanism. FIG. 1B illustrates an example situation 150 wherein the prompting takes the form of a message 152 displayed on a display screen 102 of the device. In this example, the message includes not only a prompt to charge the device, but also a date by which the device should be charged to avoid potential problems with the device and/or battery. Further, the date by which the device should be charged can be based upon any of a number of factors discussed and suggested herein, such as current charge level and overall battery size or capacity, among other such factors. Notifying the user of when a device needs to be charged can help to maintain the health of the battery and of the device, particularly if a user expects to use the device for an extended period of time, such as for five years or more. Further, such an approach enables warehouse personnel or other such persons to determine the condition of devices in long-term storage and whether service charging is required for the health of the device and/or battery. Such an approach can help to ensure that devices sold after long-term storage still meet battery performance requirements. Various approaches thus can notify users or other appropriate persons or entities that a device should be charged before a zero volt lockout or other such state or event occurs. In one example, a battery with capacity of less than 400 mAh might reach a charge level of less than 3.4V on Sep. 22, 2015. A device such as an electronic reader with an electronic ink screen might then generate a prompt message that indicates that the device should be charged by Sep. 22, 2016, to avoid problems, and then the device can shut down or go into another such low power state. As mentioned elsewhere herein, a lower power state can refer to any operational state whereby one or more functional aspects of the device are adjusted in order to cause the device to utilize or consume less power over a period of time. While a mode such as hibernate can qualify as a low power state, a low power state can also include adjustments such as turning off a display or reducing a brightness setting, slowing a processor clock speed, turning off or suspending background applications and processes, and other such adjustments. A full power state, on the other hand, can correspond to a state where all functions are operating at an intended capacity for active use and not adjustments have been made for purposes of reducing power consumption, at least in some embodiments. For electronic ink displays the prompt can stay displayed on the screen after being written without requiring any additional power, as is known for such types of displays. While the actual date to charge might change over that year, the date to charge can be calculated using a conservative approach such that a lockout might not actually occur on that date, for example, but that date is the most conservative date in order to ensure that a lockout does not occur under potential anticipated conditions.

Figure 2:
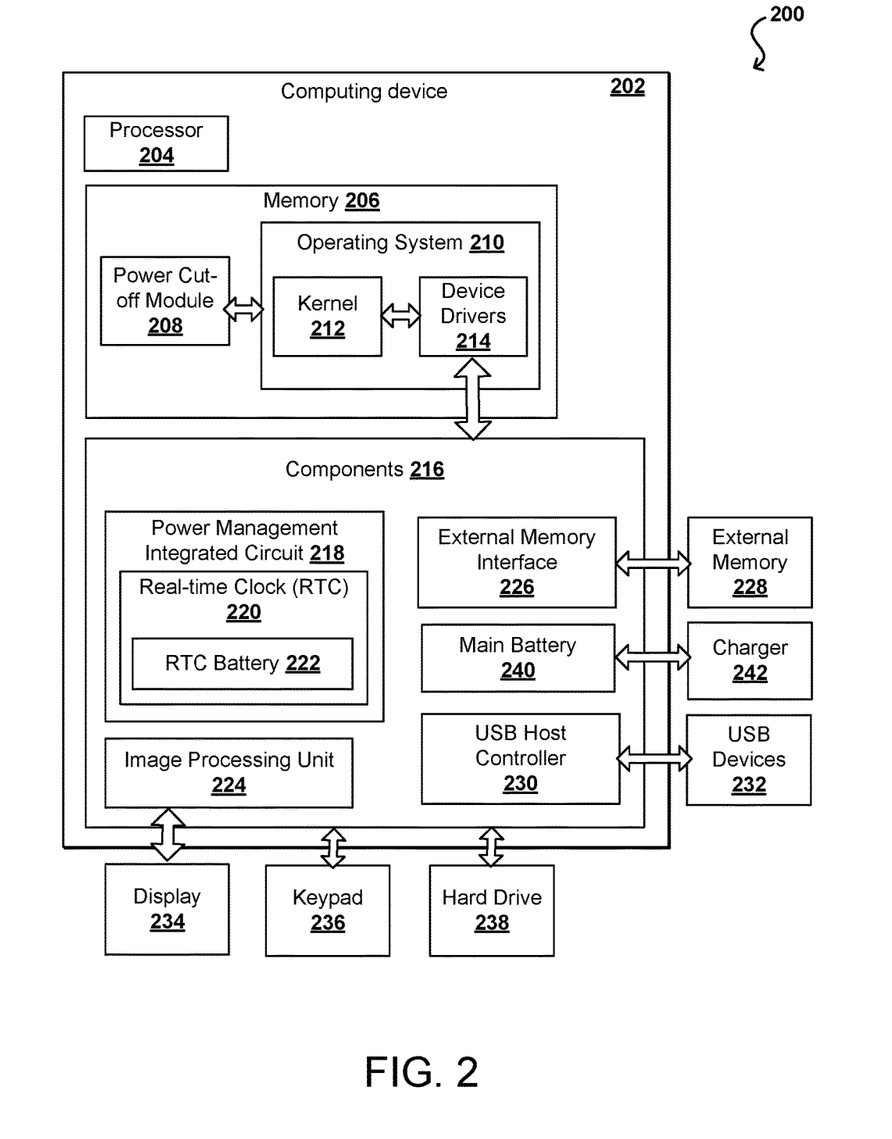
FIG. 2 illustrates components of an example client device that can be utilized in accordance with various embodiments.

FIG. 2 illustrates components 200 for an example computing device 202 that can implement approaches in accordance with various embodiments. In this example, a central processor unit ("processor") 204 is shown within the computing device 202. Memory 206 within the device may store an operating system 210 comprising a kernel 212. The memory 206 may also store a power cut off module 208, which is coupled to the kernel 212. The power cut off module 208 can be configured to perform specific acts, including placement of the device into a power cut off mode. The kernel 212 may be operatively coupled to one or more device drivers 214 that are stored in memory 206. These device drivers 214 may include, for example, a display driver, external memory interface driver, USB host controller driver, and so forth. The device drivers 214 can be operatively coupled to a variety of different devices or components 216.

The example computing device 202 also includes a power management integrated circuit (PMIC) 218. The PMIC 218 is configured to, among other functions, distribute and control power to the processor 204, the components 216, and so forth. For example, the PMIC 218 may be configured to maintain a wait-for-interrupt state. While in the wait-for-interrupt state, upon receiving a wakeup interrupt, the PMIC 218 can power up the processor 204 and other components 216 to a running awake mode. In some implementations, the PMIC 218 may be specific to a particular processor 204. The PMIC 218 may incorporate, or couple to, a real-time clock (RTC) 220. The RTC 220 is configured to maintain a clock suitable for tracking calendar date and time. The RTC 220 may be used for several purposes, including acting as a source of information for digital rights management (DRM), providing time comparison for a global position system unit for ephemeris checking, providing a reference for battery charge calculations, and so forth. Although an internal RTC 220 is illustrated, it should be understood that one or more external RTCs can be used for such purposes as well within the scope of the various embodiments. The RTC 220 may be periodically updated from an external reference, such as a user input, cellular network time, network time protocol, and so forth. Maintaining the RTC 220 enhances the user experience by allowing charge calculation functionality even when no external reference is available or when the external reference is not deemed to be trustworthy. In some implementations, the RTC 220 may be coupled to an RTC battery 222. The RTC battery 222 may provide a power source independent of a primary battery 240, which is rechargeable and may also be removable in at least some embodiments, within the computing device to maintain operation of the RTC 220. For example, the RTC battery 222 provides power for the RTC 220 to continue functioning when the main battery 240 is depleted or removed. The RTC battery 222 may comprise a capacitor, coin cell, and so forth.

An image processing unit 224 is shown coupled to a display 234. The display can be any appropriate display, such as a LCD, organic light emitting diode ("OLED"), electrophoretic ink ("e-ink"), or other such display. The image processing unit 224 may be configured to, at the direction of the processor 204, take input data and generate an image suitable for presentation on the display 234. It also should be mentioned that there can be various internal and/or external display elements used in a computing device in accordance with various embodiments. The display 234 may be capable of presenting an image while the processor 204 is in a low power or off mode. Reflective displays including electrophoretic displays, cholesteric liquid crystal displays, electrofluidic displays, and so forth present an image without applied power. In some implementations, displays that present an image using applied power, such as an OLED display, may be configured to enter a self-refresh mode, allowing the display to remain active and present content while the processor 204 is in the low power or off mode. In some implementations, the computing device 204 may comprise two or more displays using different technologies. For example, a first display may comprise an electrophoretic display while a second display comprises an OLED. The computing device may also include a keypad 236 embedded or coupled thereto, which can include page turn buttons and a keyboard, among other such options. The device may also include a power switch, activation of which generates an interrupt that may be used to trigger a change in power state. For example, when the computing device is in a sleep mode, activation of the power switch may wakeup the device. In another example, the duration of activation of the power switch may be used to specify a particular mode. For example, a two-second activation while the device is in awake mode may result in the device entering a sleep mode, while a four-second activation may place the device in the power cut off mode. When the computing device is in an active awake mode, activation of the power switch may, trigger entry into a sleep mode, or a power cut off mode. Configuration, duration of the activation, and so forth may determine whether sleep or power cut off mode are triggered. Each of these modes can have a different rate of power consumption, which can be used to estimate the remaining charge on the battery in at least some embodiments.

The example device 202 of FIG. 2 also includes an External Memory Interface ("EMI") 226. The EMI 226 may be coupled to external memory 228, which may comprise Static Random Access Memory ("SRAM"), Pseudostatic Random Access Memory ("PSRAM"), Synchronous Dynamic Random Access Memory ("SDRAM"), Double Data Rate SDRAM ("DDR"), NAND Flash, and so forth. In some implementations, at least a portion of the power cut off module 208, operating system 210, applications, content, and so forth, may be stored in the external memory 228. The device may also include a USB controller device 230, which may couple to USB devices 232, such as a wireless wide area network modem. The USB controller device 230 may comply with any of the USB standards including USB 1.0, 1.1, 2.0, 3.0 as set forth by the USB Implementers Forum. The device may also include at least one storage component such as a hard drive 238, which may use magnetic or optical memory on spinning disks or solid state storage. The hard drive 238 may be used to store content for consumption by the user, such as electronic books or digital images. The computing device may further include one or more other devices, as may include a Firewire bus, camera, global positioning system receiver, Bluetooth™ wireless device, PC Card device, and so forth. Operative couplings, such as those between the kernel 212, the power cut off module 208, and the device drivers 214 are shown for emphasis. All devices in FIG. 2 are operatively coupled, with their respective arrows omitted only for clarity of illustration.

Figure 3:
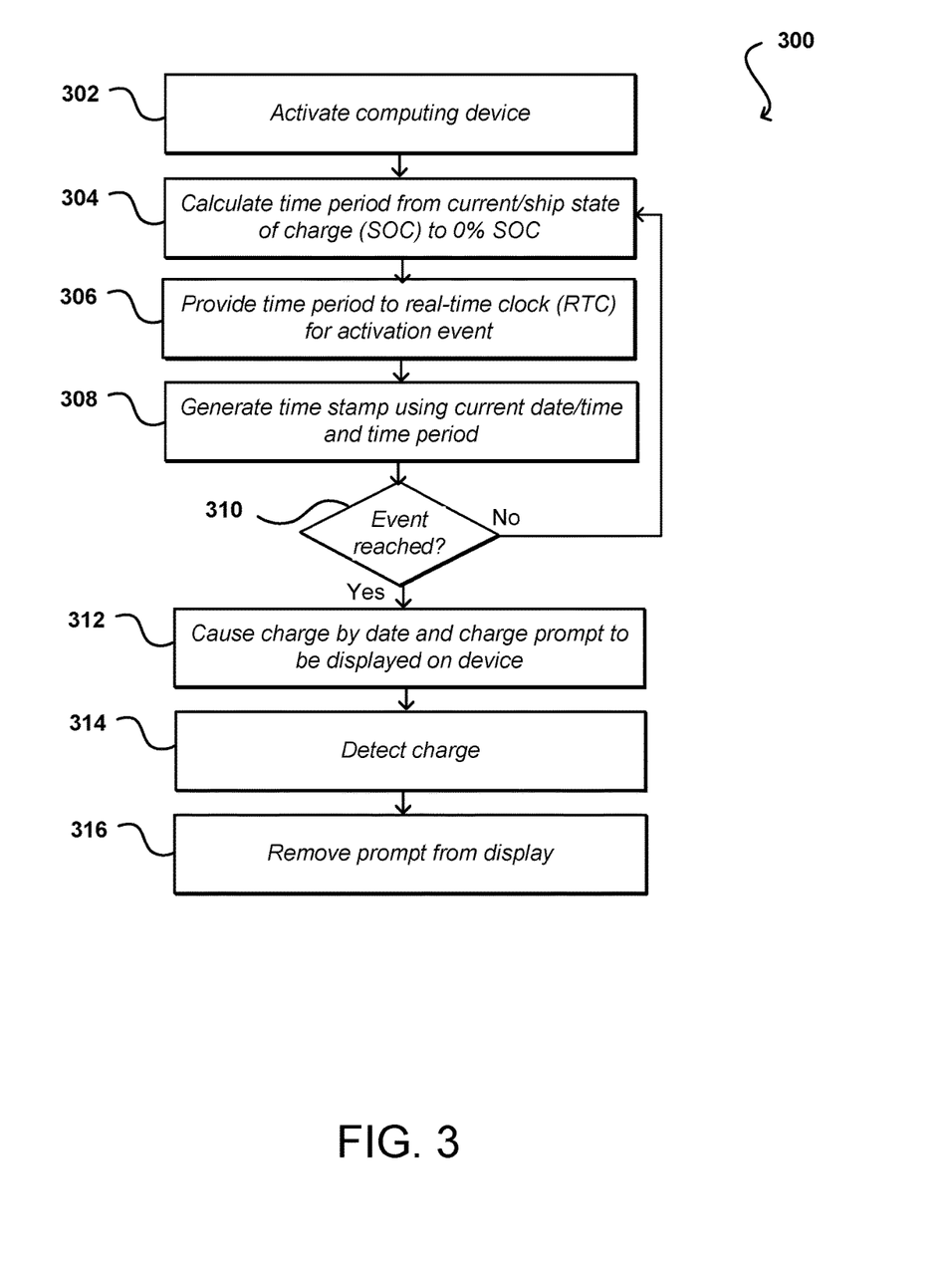
FIG. 3 illustrates a first example process for providing charging information that can be utilized in accordance with various embodiments.

As mentioned, such a device can have various modes of operation, and there can be different processes, or portions of the same process, used with each of the various modes of operation. For example, FIG. 3 illustrates an example process 300 for determining and providing charge prompts in a ship mode that can be utilized in accordance with various embodiments. It should be understood that there can be additional, fewer, or alternative steps performed in similar or alternative orders, or in parallel, within the scope of the various embodiments unless otherwise stated. In this example, a new computing device is activated 302, where that device includes a main battery, processor, and other components such as those discussed with respect to FIG. 2. While at the factory or other place of manufacture or testing, for example, software on (or external to) the device can calculate 304 a period of time for the charge on the device to go from a ship state of charge (SOC) to a dead battery state, or zero percent SOC. The result can be provided 306 for use in a calculation on a real time clock (RTC) wake-up for the device that will occur directly before a shutdown, such as just before or when the battery reaches a 3.4V charge. The value can be used to generate 308 a time stamp that will be displayed on the device, where the time stamp can include the time until a dead battery state plus an amount of time before a lockout event occurs. In this example, the time stamp can correspond to the expected date of 0% charge plus one year. One year might be selected as an appropriate time period based on the range of possible time periods in order to be conservative and prevent a lockout or other such occurrence that might begin to occur for devices after that period of time. In some embodiments, a state of charge of the device can be monitored in addition to the generation of the RTC activation event. If, at some point, it is determined 310 that the main battery is about to reach a dead state, or 0% SOC, whether through monitoring or upon reaching the activation event, the device can cause 312 the time stamp and charge prompt to be displayed on the device. When a charge is subsequently detected 314 that causes the main battery to no longer be in, or near, the dead state, the prompt can be removed 316 from the display. If the device is taken out of the hibernate state then a different process can be used. If the device remains in the hibernate state, then a new activation event can be generated for the device.

Figure 4:
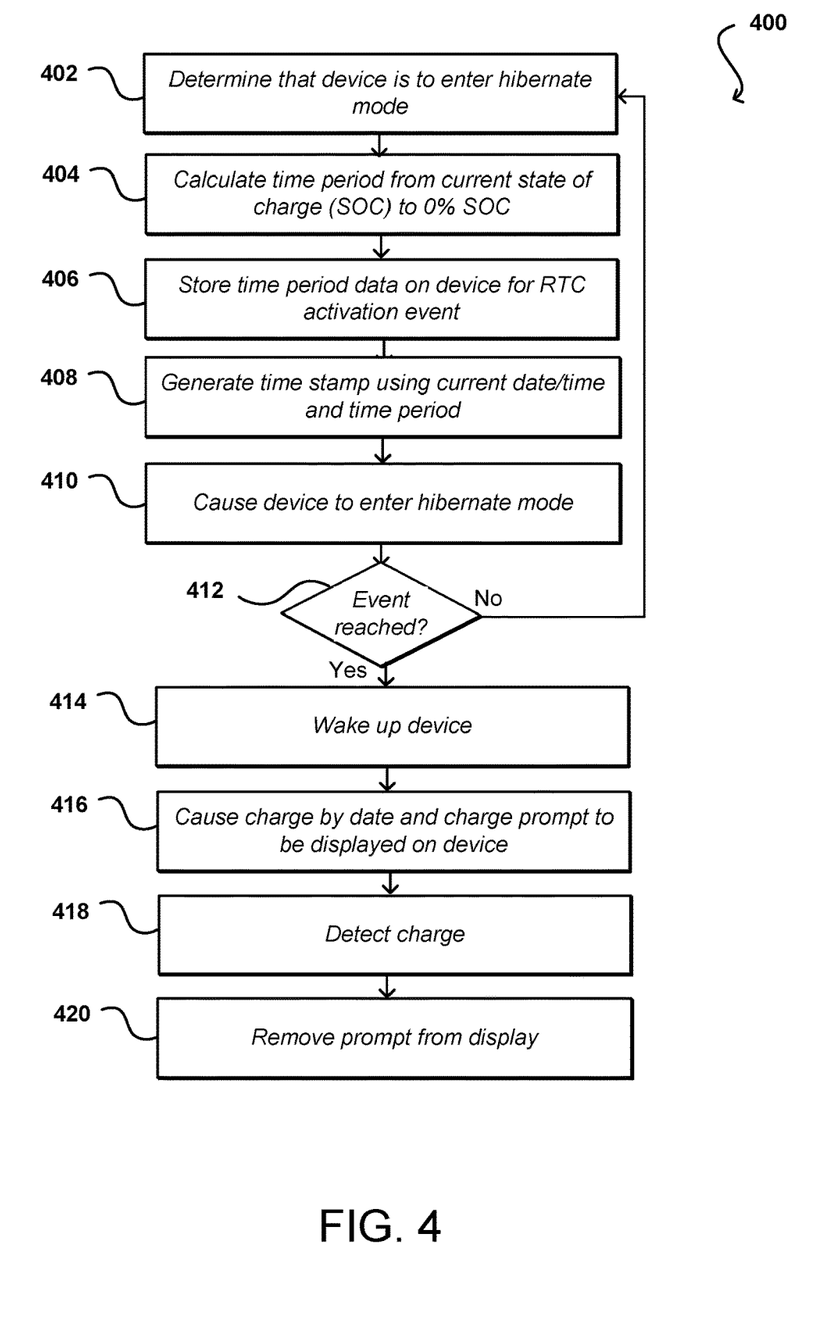
FIG. 4 illustrates a second example process for providing charging information that can be utilized in accordance with various embodiments.

FIG. 4 illustrates an example process 400 for determining and providing charge prompts in a hibernate mode that can be utilized in accordance with various embodiments. In this example, the device typically will have been received to a customer and activated and/or used by that customer. At some point the device it will be determined 402 that the device is to enter a hibernate mode. The hibernation instruction can be provided manually by the user or automatically by the hardware and/or software on the device, among other such options. In a hibernate mode limited functionality on the device remains active in order to minimize power usage and resource consumption while the device is not being actively utilized by a user or performing another such task. In this example, the battery will have been charged but will slowly lose charge over time as the device is in hibernate mode. Software on (or external to) the device can calculate 404 a period of time for the charge on the device to go from a current state of charge (SOC) to a dead battery state, or zero percent SOC. The time period data can be fed into a calculation on the real time clock (RTC) wake-up for the device that will occur directly before a shutdown, such as just before or when the battery reaches a 3.4V charge, and that value can be stored 406 on the device. The time period value can also be used to generate 408 a time stamp that will be displayed on the device, where the time stamp can include the time until a dead battery state plus an amount of time before a lockout event occurs. After the appropriate values are determined and event data stored appropriately, the device can be caused 410 to enter a hibernate (or other such) mode. At some point, a determination will be made 412 that the activation event has been reached or the device is otherwise about to run out of charge. This can include, for example, reaching a specified level of charge, such as 3% or 5% SOC. The RTC activation event being reached can cause the device to wake up 414, or change from the hibernate mode to at least a quasi-active mode of operation. The device can cause 416 the time stamp and charge prompt to be displayed on the device. When a charge is subsequently detected 418 that causes the main battery to no longer be in, or near, the dead state, the prompt can be removed 420 from the display. In some cases, the data can be saved until a charge event for recording purposes, such as in case the device is returned or transferred to another user, etc.

Figure 5:
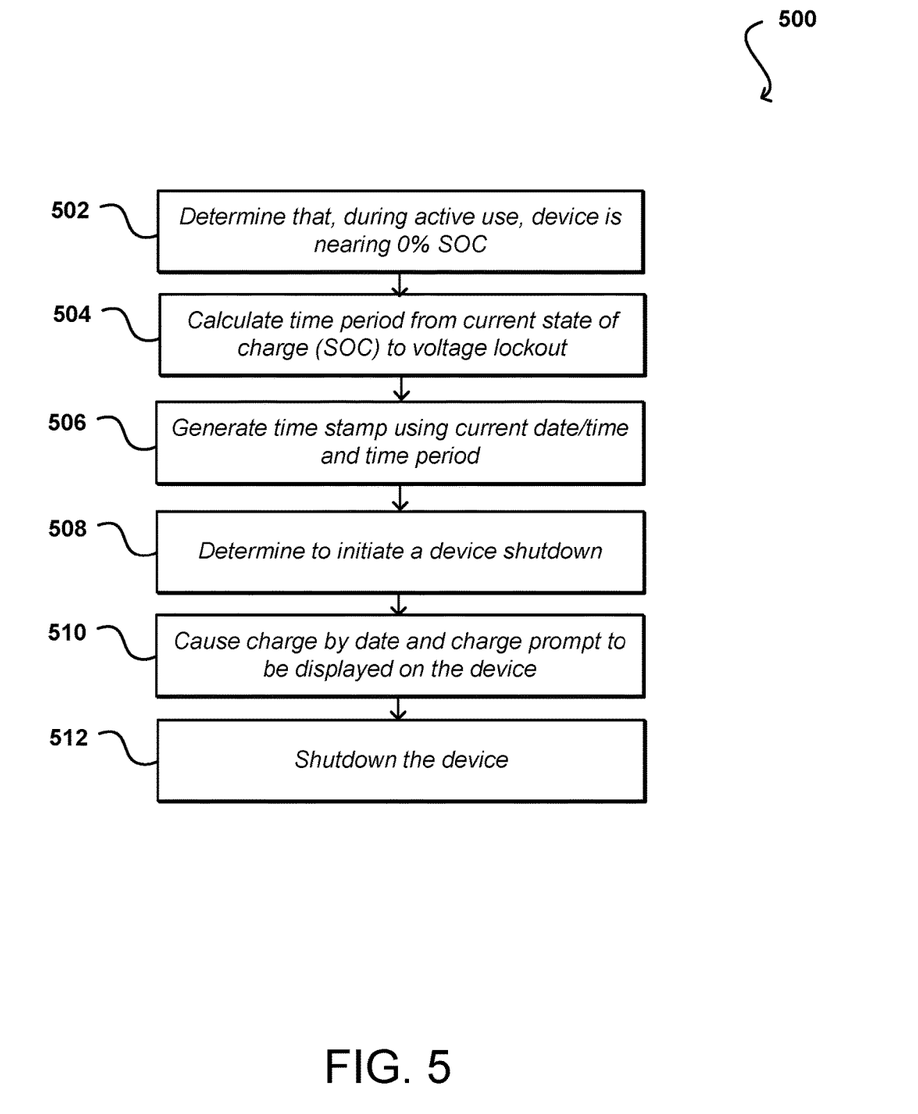
FIG. 5 illustrates a third example process for providing charging information that can be utilized in accordance with various embodiments.

FIG. 5 illustrates an example process 500 for determining and providing charge prompts in an active use mode that can be utilized in accordance with various embodiments. In this example, the device typically will have been received to a customer and activated by the user. In this example, the computing device will operate in an active state, as may be under direction of a user. During the active state, a determination can be made 502 that the battery will soon run out of usable charge, as the battery nears a 0% SOC. Software on (or external to) the device can calculate 504 a period of time for the charge on the device to go from a current state of charge (SOC) to a zero volt lockout. The time period data can be used to generate 506 a time stamp that will be displayed on the device, where the time stamp can include the time until a dead battery state plus an amount of time before a lockout event occurs. As part of the graceful shutdown process, various other tasks can be performed before the device shuts down. These tasks can include, for example, saving documents, writing state information to logs, closing applications, and performing other such tasks. When it is determined 508 that the tasks have been performed and the device shutdown should occur, the date stamp and prompt can be caused 510 to be displayed on the device, and a device shutdown can be completed 512. As mentioned, depending upon the type of display and other such components, the display may or may not need to have some level of power and activity to cause the information to remain displayed, such as for an LCD screen instead of an e-ink display. When a charge is subsequently detected that causes the main battery to no longer be in, or near, the dead state, the prompt can be removed from the display.

The following example table illustrates the estimated time duration for a 250 mAh battery within a device that is shipped at an 85% SOC until the battery is in a condition of less than one volt.

| Voltage range | Capacity (mAh) | Device Current in Ship Mode (microA) | Battery Self-discharge (microA) | Total Ship Mode Current (microA) | Days |
|---|---|---|---|---|---|
| 85% SOC to 3.4 V | 201.9 | 19 | 16.25 | 35.25 | 238 |
| 3.4 V to 2.3 V | 9 | 19 | 3 | 17 | 17 |
| 2.3 V to 1.0 V | 5 | 0 | 0.5 | 416 | 416 |
| | | | | Total Days until <1 V | 671 |

In this example the device is initially charged to 85% SOC in order to prevent an additional irreversible capacity loss from overcharging the battery for shipping, even though it can be desired to have the charge as high as possible to enable the user to more quickly utilize the device upon receipt. Storing the battery with too little charge can result in a storage self-discharge current leak in the battery pack as discussed previously.

As mentioned, there can be many reasons to implement a 0V charge lockout, and approaches in accordance with various embodiments can help to minimize the impact of such lockout capability upon users of these devices. As mentioned, there can be various safety risks, particularly for small capacity cells where, after reaching a charge level of less than one volt, the copper could dissolve and induce lithium plating upon charge. The battery in a state of less than one volt could swell, with possible pouch breach and a degradation in battery performance. In order to protect users from such potential safety issues, a device in storage (i.e., not shipped to a customer) for over two years that reaches a charge state of less than one volt can be locked out from charging. If the device is already in the hands of a user, and the user does not charge their device within one to two years, the device might reach a less than one volt charge state whereby the device will be locked out. It can be preferable in at least some situations to have reassurance, from a safety, reliability, and performance perspective, that users are not using a battery in a bad state with less than a one volt charge. Such approaches can extend to any product with a display, audio, or other notification mechanism for communicating the storage and self-discharge expectations, as well as when to charge a device to maintain health of the device and battery by limiting the possibility of a battery reaching a less than one volt condition.

From the table above, it can be seen that an example device can have at least three states. The first is a charged state where the battery has above what is referred to as a 0% charge, which for the example device is around 3.4V. At this point, the device might hibernate or go into another inactive state until charged. Under 3.4V there can be some self-discharge (if the device is not charged) where the device is under a voltage protection feature and many processes may be unavailable. If the charge falls below 1 volt, a lockout can be triggered. It thus can be desirable to keep a device out of the voltage protection feature if possible while being stored, but important to charge the device before going into a lockout state, particularly where the battery is not removable and the device overall would become inoperable.

Various components can be utilized when determining the remaining charge times and/or charge-by dates in accordance with various embodiments. In some embodiments, a main processor is used for the determination, while in other embodiments dedicated processors or memory components can be used, among other such devices. In at least some embodiments a real-time clock is utilized, as discussed elsewhere herein, as may be a general RTC for the device, a dedicated RTC for the memory components, or an external RTC, among other such options. In one example, such as when a device enters ship mode, a current date and time value can be determined from an appropriate RTC, a current charge value can be obtained from a battery monitor, and a processor can use these inputs along with information for the device and/or battery (such as type of battery (e.g., alkaline, lithium, or lithium ion), battery usage in ship mode (if any), rate of charge drain, and the like) to determine a minimum period of remaining charge on the battery. The process can then determine the date at the end of that minimum period from the current date and time, and can cause that date to be displayed, stored, and/or used to generate a notification as to the date by which the device should be charged.

In one example, a set of equations can be used to determine the appropriate charge date. A first equation can be used to calculate the time from a measured % SOC to a 0% SOC, or a "zero charge" state as would be reported to the user. This value is given by:

$$\text{Time\_to\_0\% } SOC = \frac{\% SOC * \text{max\_capacity}(mAh)}{\text{device\_current (mA)} + \text{self\_discharge\_current (mA)}} = \text{hours}$$

A second equation can provide the time from a no usable charge state to a voltage protection feature state, which in this example is a point where there is a 2.3V charge on the battery, defined as the voltage protection value, or the point at which the voltage protection feature state is entered. This value is given by:

$$\text{Time\_to\_FET\_UVP} = \frac{\text{capacity\_to\_FET\_UVP (mAh)}}{\text{device\_current (mA)} + \text{self\_discharge\_current (mA)}} = \text{hours}$$

A third equation can provide the time from the FET UVP (i.e., 2.3V) state down to a 0V lockout state, where the voltage in this example is less than 1V. As mentioned previously, a 0V lockout as used herein refers to a state of a battery where the battery cell voltage drops below one volt, such that the device is no longer able to charge. This can be given by:

$$\text{Time\_to\_0V\_lockout} = \frac{\text{capacity\_to\_} < 1 \text{ V (mAh)}}{\text{battery\_self\_discharge\_current (mA)}} = \text{hours}$$

The total time to be calculated, and thus used to determine the recommended charge date, can be based upon the total predicted amount of time to a zero volt lockout state based at least in part upon the current charge on the battery. The total time thus can be given by:

Total_time=Time_to_0% SOC+Time_to_FET_UVP+ Time_to_0V lockout

The charge by date can thus be determined by taking the current date and time, as may be determined using an RTC or other such component on, or in communication with, the device, and adding the total time to 0V lockout.

In one example, a device in the factory can be placed into ship mode, whereby the device can operate in a low power, hibernate, or "off" mode until such time as it is received and activated by a customer. The device as part of the process of entering ship mode can perform the above calculations using an RTC on the device (or an external RTC if connected to a terminal at the factory, etc.). In some embodiments this calculation can be performed by a factory computer and uploaded to the device, among other such options. In some embodiments the calculations can be performed offline to determine an expected period until 0V lockout based on the configuration and type of device, as well as the minimum charge on the battery for storage and shipping, and the charge by date can be calculated based on these values.

In another example, a device might run out of available charge while in a hibernate mode. At this time, the device can calculate an updated charge by date using only the second and third equations, or the time from a 0% SOC to a 0V lockout. The new charge by date can then be determined and displayed on the device or otherwise provided as a notification or prompt. Before going into a hibernate state, such as when there is 5% SOC or 3% SOC, the RTC (a main RTC or battery-specific RTC, for example) can be utilized to determine the calculation before reaching 0% SOC, whereby the charge date can be displayed when the device reaches 0% SOC and goes into a hibernate or similar state. A similar process can be performed just before reaching a voltage protection feature state, although for such a situation it might be necessary to temporarily wake up the processor, RTC, or other such component(s) to perform a new calculation and update the display. Just before 0V lockout occurs, a notification can be sent from a remote system or service having the date information as mentioned previously. This can be advantageous for a number of reasons, such as the desire to utilize as little power on the device as possible in order to push out the lockout date, as well as to ensure that the user receives the notification, as a device having sat idle for a year or two may no longer have an active network connection, current contact address, etc. If the device is still in storage, this can prompt warehouse personnel to either send the device back for charging or refurbishing, charge the device on site, or take another such action.

As mentioned, in many instances the values and calculations used are intended to cover a worst case scenario, and will in most cases be more conservative than necessary. Such an approach helps to minimize device lockouts, and charge dates displayed that do not allow for sufficient charging time. There can be significant variation between specific batteries and devices, even of the same type and with the same charge, but such an approach can take this into consideration. While the charge levels of various devices could be monitored while in a warehouse, for example, the approach utilized should avoid the need for such monitoring, which can help to reduce the cost and resources needed for charge determinations. In some embodiments a table of charge times could be maintained for various types of devices, and this table could be used along with a manufacture date on the packaging of a device to determine the date that a devices needs to be charged to avoid 0V lockout. For any of the approaches discussed herein, however, if higher accuracy is desired then the current charge can be determined and/or monitored and the charge by date updated as appropriate or desired. Additional notifications can also be sent, such as at 10% SOC or other values, in order to provide notifications to users who may not access the device to see the prompt and who would need sufficient lead time in order to be able to charge the device, such as where the device is in storage or a different geographic location, etc. In some embodiments a notification can also be sent each time the device changes state, such as going into a hibernate or voltage protection state. This information in some embodiments is communicated from the device to a remote system or service, which can notify the appropriate party at an appropriate time, or at least have timestamp information available through a console, webpage, or other such mechanism. Notifications can also be sent to other devices linked to the user or account, such as a smartphone or tablet. In some embodiments the RTC can periodically be activated during a hibernate state to recalculate the charge by date in order to improve accuracy, among other such options.

In some embodiments additional thresholds or values can be established whereby notifications can be sent or information displayed. For example, the overall lifetime of the battery can be extended in some embodiments if the battery is properly serviced. In some embodiments an additional battery life preservation value, or threshold, can be set at 2V, which can reduce the risk of copper dissolution for some batteries. A battery life preservation value can be selected based on the type of battery used, for example, where the battery life preservation value prevents the battery life from being shortened due to a low voltage on the battery. A battery life preservation value of 2V might be appropriate for lithium ion batteries, while other values may be appropriate for other battery types, such as a value of 0.7V for alkaline batteries (i.e., to avoid swelling and leaking).

Figure 6:
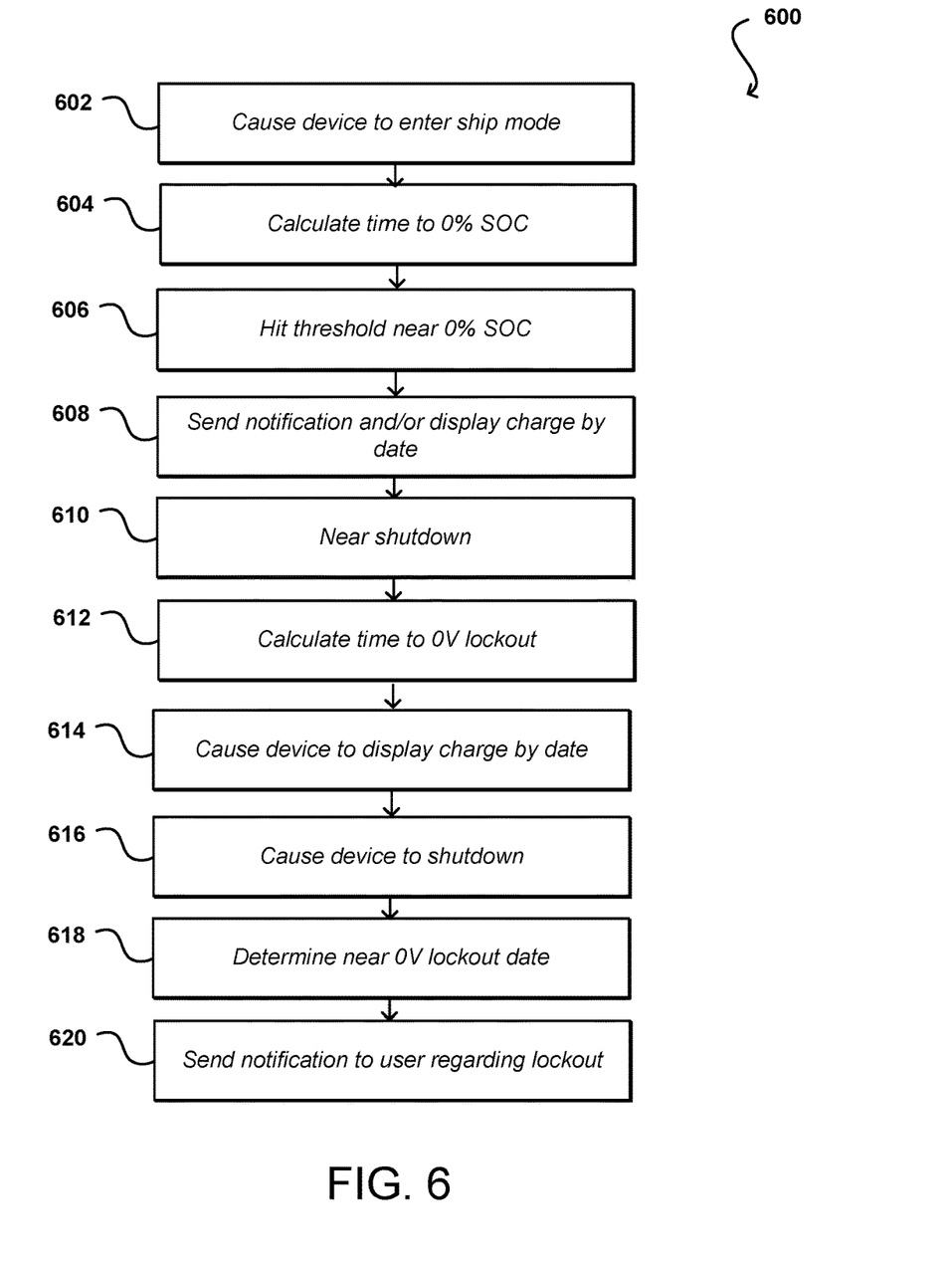
FIG. 6 illustrates a fourth example process for providing charging information that can be utilized in accordance with various embodiments.

FIG. 6 illustrates an example process 600 that can be performed for a device that is never charged in accordance with various embodiments. In this example, a computing device that is ready for purchase and shipment to a customer can be caused 602 to enter a ship mode, or similar operational state. As part of the process, a time from a current state of charge (SOC) to a 0% SOC can be calculated 604, as it can be desirable in at least some embodiments for the device to arrive to the customer with some level of charge so the customer can utilize the device. In other embodiments the device might calculate a time to 0V lockout, as the manufacturer or retailer may not care whether the user has to first charge the device, but does not want the device to reach a lockout state where it is unable to be used by the device. Various other levels and values can be utilized as well as discussed and suggested elsewhere herein. In this example, a threshold can be reached 606 that is near 0% SOC, such as a 3% or 5% threshold value. This can be determined in various ways, such as though charge monitoring, based on an activation event set for the device, in response to a remote service having received the time period data, and the like. At such a time, the device in some embodiments can be caused 608 to display a notification of the charge date and need and/or a notification can be generated about the need to charge.

In this example, no charge is received and the device nears 610 a shutdown state, such as by getting near 0% SOC. Before the shutdown, as part of a graceful shutdown process, the time to a 0V lockout can be calculated 612. This information can be stored to a remote service, for example, as well as being caused 614 to be displayed on the device. In at least some embodiments this could happen in advance, when adequate battery charge is available for communication, as well as having enough power to communicate. The device can then be shutdown 616. It can subsequently be determined 618, such as by using the date information calculated for the device, that the lockout date is nearing, such as being a week or a month away. As a result, a notification 620 can be sent or otherwise provided to a user, or other entity, regarding the upcoming lockout so the device can be charged before it becomes unusable. Various other notifications, prompts, triggers, and thresholds can be used as well as discussed and suggested herein with respect to the various embodiments.

Figure 7:
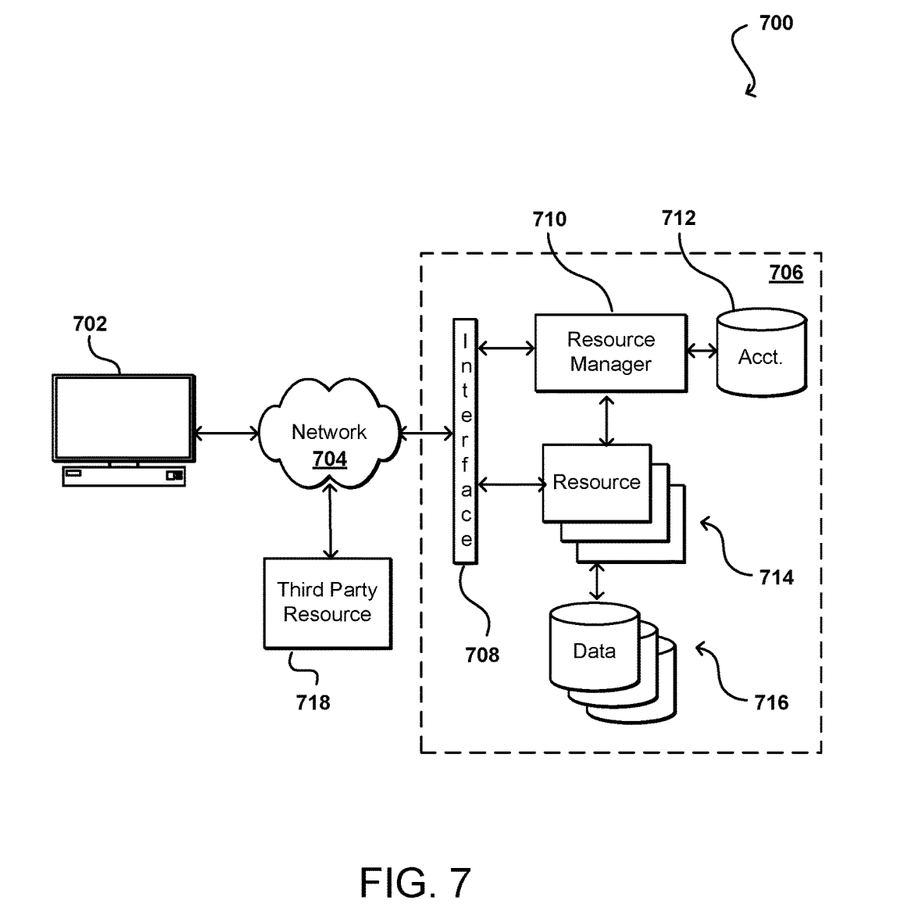
FIG. 7 illustrates an example environment in which various embodiments can be implemented.

FIG. 7 illustrates an example environment 700 in which aspects of the various embodiments can be implemented. In this example a user is able to utilize a client device 702 to submit requests across at least one network 704 to a resource provider environment 706. In at least some embodiments, the resource provider environment can operate a service that monitors device charge states and/or charge-by dates, and can send notifications to a user associated with a particular device. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment (or multi-tenant environment) is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate non-transitory media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a battery; and
   memory including instructions that, when executed by the at least one processor, cause the computing device to:
   determine a current state of charge (SOC) of the battery;
   place the computing device in a low power state prior to the computing device being shipped, the battery providing power to the computing device in the low power state;
   calculate, based at least in part upon the current SOC, a first period of time before the battery reaches a specified state of charge;
   determine, based at least in part upon the first period of time and a current date, a first date by which the computing device should be charged to prevent the battery from reaching the specified state of charge;
   calculate, based at least in part upon the specified SOC, a second period of time before the battery reaches an inoperable state, the inoperable state corresponding to a 0V lockout state;
   determine, by summing the first period of time and the second period of time, a second date by which the computing device should be charged to prevent the battery from reaching the inoperable state;
   provide a first notification including the first date by which the computing device should be charged; and
   provide a second notification after the first date and within a threshold amount of time prior to the second date, the second notification including the second date at which the battery will reach the inoperable state, the first date and the second date being after the computing device is shipped.

2. The computing device of claim 1, further comprising:
   an electrophoretic display screen for displaying notifications, wherein the notifications include a prompt to charge the computing device by the first date or the second date, the electrophoretic ink display configured to display the notifications without additional power being applied to the display screen.

3. The computing device of claim 1, wherein the instructions when executed further cause the computing device to:
provide the notifications to a remote service configured to send a prompt associated with the computing device.

4. The computing device of claim 1, further comprising:
a real-time clock (RTC) configured to provide time and date information for use in calculating the date by which the computing device should be charged.

5. The computing device of claim 1, wherein the specified state of charge is 0% SOC.

6. The computing device of claim 1, wherein the instructions when executed further cause the computing device to:
determine at least one of the periods of time further based at least in part upon at least one of a type of battery or a battery capacity.

7. The computing device of claim 1, wherein the instructions when executed further cause the computing device to:
set at least one threshold SOC value at which the first notification is to be provided, the at least one threshold SOC value being greater than the specified state of charge.

8. The computing device of claim 1, wherein the specified state of charge is a 0% SOC, and wherein the instructions when executed further cause the computing device to:
calculate the first period of time until the rechargeable battery reaches the 0% SOC value by:

$$\text{Time\_to\_0\% } SOC = \frac{\% \, SOC * \text{max\_capacity}}{\text{device\_current} + \text{self\_discharge\_current}},$$

wherein:
Time_to_0% SOC is a time, in hours, until reaching a 0% SOC value,
% SOC*max_capacity is a percentage of a maximum capacity of the battery,
device_currrent is the device current, and
self_discharge_current is a self-discharge current value.

9. The computing device of claim 1, wherein the instructions when executed further cause the computing device to:
calculate a period of time after a voltage protection feature state until the rechargeable battery reaches a 0V lockout by:

$$\text{Time\_to\_0V\_lockout} = \frac{\text{capacity\_to\_} < 1 \, V}{\text{battery\_self\_discharge\_current}},$$

wherein:
Time_to_0V lockout is a time, in hours, until reaching the 0V lockout,
capacity_to_<1V is a capacity of the battery to the 0V lockout over time, and
battery_self_discharge_current is the current at which the rechargeable battery will enter a self-discharge state.

10. The computing device of claim 9, wherein the second date by which the computing device should be charged is before a total time after the current date, the total time equal to a sum of (i) the first period of time, wherein the specified SOC is a 0% SOC value, (ii) the second period time, wherein the second period of time is a time from 0% SOC to the voltage protection feature state, and (iii) the period of time after the voltage protection feature state until the 0V lockout state.

11. A computer-implemented method, comprising:
determining, using a processor of a computing device, a current state of charge (SOC) of a battery of a computing device;
placing the computing device in a low power state prior to the computing device being shipped, the battery providing power to the computing device in the low power state;
calculating, based at least in part upon the current SOC and using the processor of the computing device, a period of time before the battery reaches a specified state of charge;
determining, using the processor and based at least in part upon the period of time and a current date, a date by which the computing device should be charged to prevent the battery from reaching the specified state of charge;
calculating, based at least in part upon the specified SOC, a second period of time before the battery reaches an inoperable state, the inoperable state corresponding to a 0V lockout state;
determining, by summing the first period of time and the second period of time, a second date by which the computing device should be charged to prevent the battery from reaching the inoperable state;
providing a first notification including the first date by which the computing device should be charged date; and
providing a second notification after the first date and within a threshold amount of time prior to the second date, the second notification including the second date at which the battery will reach the inoperable state, the first date and the second date being after the computing device is shipped.

12. The computer-implemented method of claim 11, further comprising:
causing, using the processor of the computing device, notifications to be displayed on a display screen of the computing device, wherein the notifications include a prompt to charge the device by the respective first date or second date.

13. The computer-implemented method of claim 11, wherein the specified state of charge is 0% SOC.

14. The computer-implemented method of claim 11, further comprising:
determining, using the processor of the computing device, at least one of the periods of time further based at least in part upon at least one of a type of battery or a battery capacity.

15. The computer-implemented method of claim 11, wherein the specified state of charge is a 0% SOC, and further comprising:
calculating the first period of time until the rechargeable battery reaches the 0% SOC value by:

$$\text{Time\_to\_0\% } SOC = \frac{\% \, SOC * \text{max\_capacity}}{\text{device\_current} + \text{self\_discharge\_current}},$$

wherein:
Time_to_0% SOC is a time, in hours, until reaching a 0% SOC value,
% SOC*max_capacity is a percentage of a maximum capacity of the battery,
device_currrent is the device current, and
self_discharge_current is a self-discharge current value.

16. The computer-implemented method of claim 11, further comprising:

calculating a period of time after a voltage protection feature state until the rechargeable battery reaches a 0V lockout by:

$$\text{Time\_to\_0V\_lockout} = \frac{\text{capacity\_to\_} < 1\text{ V}}{\text{battery\_self\_discharge\_current}},$$

wherein:

Time_to_0V lockout is a time, in hours, until reaching the 0V lockout, capacity_to_<1V is a capacity of the battery to the 0V lockout over time, and battery_self_discharge_current is the current at which the rechargeable battery will enter a self-discharge state.

17. A computing device, comprising:

at least one processor;

a battery; and memory including instructions that, when executed by the at least one processor, cause the computing device to:

determine a current state of charge (SOC) of the battery;

cause the battery to provide power to the computing device in a low power state prior to the computing device being shipped;

calculate, based at least in part upon the current SOC, a first period of time before the battery reaches a specified state of charge;

calculate, based at least in part upon the specified SOC, a second period of time before the battery reaches an inoperable state, the inoperable state corresponding to a 0V lockout state;

determine, by summing the first period of time and the second period of time, a date by which the computing device should be charged; and provide a notification within a threshold amount of time prior to the date, the notification including the date by which the computing device should be charged before the battery reaches the inoperable state, the date being after the computing device is shipped and the notification being provided after the computing device is shipped.

18. The computing device of claim 17, further comprising:

a display configured to display the notification without additional power from the rechargeable battery being applied to the display screen.

19. The computing device of claim 17, wherein the instructions when executed further cause the computing device to:

provide the notification to a remote service configured to send a prompt associated with the computing device.

20. The computing device of claim 17, wherein the specified state of charge is 0% SOC.

* * * * *